(12) United States Patent
Dick (10) Patent No.: US 7,398,909 B2
(45) Date of Patent: Jul. 15, 2008

(54) PIPE COLLETS

(75) Inventor: Ronald L. Dick, Boston Heights, OH (US)

(73) Assignee: Swagelok Company, Solon, OH (US)

( * ) Notice: Subject to any disclaimer, the term of this patent is extended or adjusted under 35 U.S.C. 154(b) by 88 days.

(21) Appl. No.: 10/893,459

(22) Filed: Jul. 16, 2004

(65) Prior Publication Data

US 2005/0011928 A1 Jan. 20, 2005

Related U.S. Application Data

(60) Provisional application No. 60/481,103, filed on Jul. 17, 2003.

(51) Int. Cl.
*B23K 37/04* (2006.01)

(52) U.S. Cl. ...................... 228/44.5; 228/49.3

(58) Field of Classification Search .................. 269/53, 269/125; 228/44.5; 219/60, 60 A, 61; 29/234
See application file for complete search history.

(56) References Cited

U.S. PATENT DOCUMENTS

| 1,799,019 | A | | 3/1931 | Mischler |
| 2,708,110 | A | * | 5/1955 | Clay ........................... 267/162 |
| 2,846,968 | A | * | 8/1958 | Tipton ......................... 269/201 |
| 3,069,529 | A | * | 12/1962 | Gotch ........................ 219/60 A |
| 3,166,664 | A | | 1/1965 | Paton et al. |
| 3,266,700 | A | * | 8/1966 | Bauer et al. ................... 228/5.1 |
| 3,566,507 | A | * | 3/1971 | Jacobsen ..................... 29/281.5 |
| 3,636,294 | A | | 1/1972 | Peyrot |
| 3,668,359 | A | | 6/1972 | Emmerson |
| 3,711,938 | A | * | 1/1973 | Warren et al. ................ 228/213 |
| 3,864,812 | A | | 2/1975 | Fiegel, Jr. et al. |
| 3,882,299 | A | * | 5/1975 | Sciaky ....................... 219/60 R |
| 3,898,714 | A | | 8/1975 | McFadden |
| 3,901,497 | A | | 8/1975 | Dearman |
| 3,925,854 | A | * | 12/1975 | McFadden ................... 29/252 |
| 3,952,936 | A | | 4/1976 | Dearman et al. |
| 4,153,194 | A | * | 5/1979 | Leonard, Jr. .................. 228/29 |
| 4,161,640 | A | | 7/1979 | Bromwich et al. |
| 4,195,763 | A | | 4/1980 | Slavens |
| 4,250,813 | A | | 2/1981 | Slavens et al. |
| 4,314,129 | A | | 2/1982 | Wilson et al. |
| 4,344,215 | A | * | 8/1982 | Dearman .................... 29/281.5 |
| 4,356,615 | A | * | 11/1982 | Dearman ...................... 29/525 |
| 4,593,919 | A | * | 6/1986 | Butler-Smith .............. 279/4.11 |

(Continued)

FOREIGN PATENT DOCUMENTS

DE 2253525 5/1974

OTHER PUBLICATIONS

International Search Report and Written Opinion from PCT/US2005/046068, mailed Apr. 21, 2006.

*Primary Examiner*—Kiley Stoner
(74) *Attorney, Agent, or Firm*—Calfee, Halter & Griswold LLP (57) ABSTRACT

A collet for holding a workpiece having an axis includes a collet base defining a collet axis. A plurality of contact points that are not integral with the collet base are supported on the collet base for movement relative to the collet base in directions generally toward and away from the collet axis. The collet is self-aligning whereby the contact points help to align the workpiece coaxially with the collet base.

21 Claims, 6 Drawing Sheets

U.S. PATENT DOCUMENTS

| | | | |
|---|---|---|---|
| 4,623,085 A * | 11/1986 | Dearman | 228/49.3 |
| 4,698,474 A | 10/1987 | Gugel et al. | |
| 4,726,300 A | 2/1988 | Kazlauskas | |
| 4,868,367 A | 9/1989 | Benway et al. | |
| 4,923,326 A * | 5/1990 | Fietzke | 403/371 |
| 4,973,823 A | 11/1990 | Benway et al. | |
| 5,165,160 A | 11/1992 | Poncelet | |
| 5,697,135 A * | 12/1997 | Dischler | 29/237 |
| 5,744,778 A | 4/1998 | Kash et al. | |
| 5,767,491 A * | 6/1998 | Ohlsson et al. | 219/633 |
| 6,184,493 B1 * | 2/2001 | Tsuchiya | 219/161 |
| 6,325,366 B1 | 12/2001 | Kane et al. | |
| 6,380,505 B1 | 4/2002 | Stoops et al. | |
| 6,651,967 B1 | 11/2003 | Barber et al. | |
| 2005/0011928 A1 | 1/2005 | Dick | |

* cited by examiner

PIPE COLLETS

RELATED APPLICATION

This application claims the benefit of U.S. Provisional Application No. 60/481,103 filed Jul. 17, 2003, the entire disclosure of which is hereby incorporated by reference.

BACKGROUND OF THE INVENTION

Commercially available pipe typically is manufactured to a nominal outer diameter which varies plus and minus depending on the tolerance range. Collets are used to hold or clamp pipes during, for example, welding of the pipes. Welding can be accomplished with, for example, an orbital weld head of the type shown generally in U.S. Pat. No. 4,379,215, the entire disclosure of which is hereby incorporated by reference. A collet for a given pipe size needs to provide enough compliance to securely hold pipes that have a size anywhere within the given tolerance range for that pipe size. The collet typically must fit certain space constraints. Some prior art pipe collet designs use integrally machined components to provide spring-like compliance, but these designs can be inconsistent and relatively expensive, and can require mating collet components that also are relatively expensive.

The use of rigid collets for holding the pipe during the welding operation is much preferred as compared to split and/or adjustable collets or similar holding devices. The reason for this is that during the welding operation, thermal stresses tend to cause the pipe to move creating misalignment between the two sections. The movement is greater and/or more likely to happen with the split collets and the adjustable collets or holders. With respect to the solid or rigid collets, however, there are problems in assuring that pipe throughout the range of standard commercial tolerances can be held properly. That is, a typical commercially available pipe used for fluid systems and the like, has, for example, a nominal outside diameter of 3.000 inches which varies ±0.030 inches. It has been difficult to compensate for the diameter variations which result from the tolerance variations and, at times, it has been difficult to properly hold the pipe during the welding operation. Also it has at times been difficult to hold out of round pipes or tubes in the proper position relative to the weld head.

Some prior art pipe collets, designed to accommodate a significant amount of size variation, use a series of slots that are cut into the base collet material to form resilient fingers. The slots can be cut either radially outward from the theoretical center of the object to be held, or they can be cut tangentially with respect to that theoretical center. The geometry of these slots enable the collet fingers to flex, or bend, in response to the geometry of the pipe that is being clamped within the collet. Where a large amount of compliance is not required, the collets can be left solid, that is, without machined slots. Some manufacturers cut the inside diameters of these collets on the true center of the collet, and some manufacturers offset the ID cut.

SUMMARY OF THE INVENTION

The present invention relates to work holders and, more particularly, to a collet for holding cylindrical workpieces in alignment with an axis of the collet. The invention is especially suited for use in a pipe clamp for association with an orbital welder and will be described with particular reference thereto. The invention is, however, capable of broader application and could be incorporated in a wide variety of work holders and clamping units for different types of work pieces and tools. For example, the invention may be used with a facing or other finishing tool. The invention may also be used with tubes in addition to pipes, although commercially available tube collets are often sufficient to accommodate the tolerance variation in tube sections.

In one embodiment, the invention relates to a collet for holding a workpiece having an axis. The collet includes a collet base defining a collet axis. A plurality of contact points that are not integral with the collet base are supported on the collet base for movement relative to the collet base in directions generally toward and away from the collet axis. The collet is self-aligning whereby the contact points help to align the workpiece coaxially with the collet base.

BRIEF DESCRIPTION OF THE DRAWINGS

The foregoing and other features of the invention will become apparent from the following description when read in conjunction with the accompanying drawings wherein.

DETAILED DESCRIPTION

Figure 1:
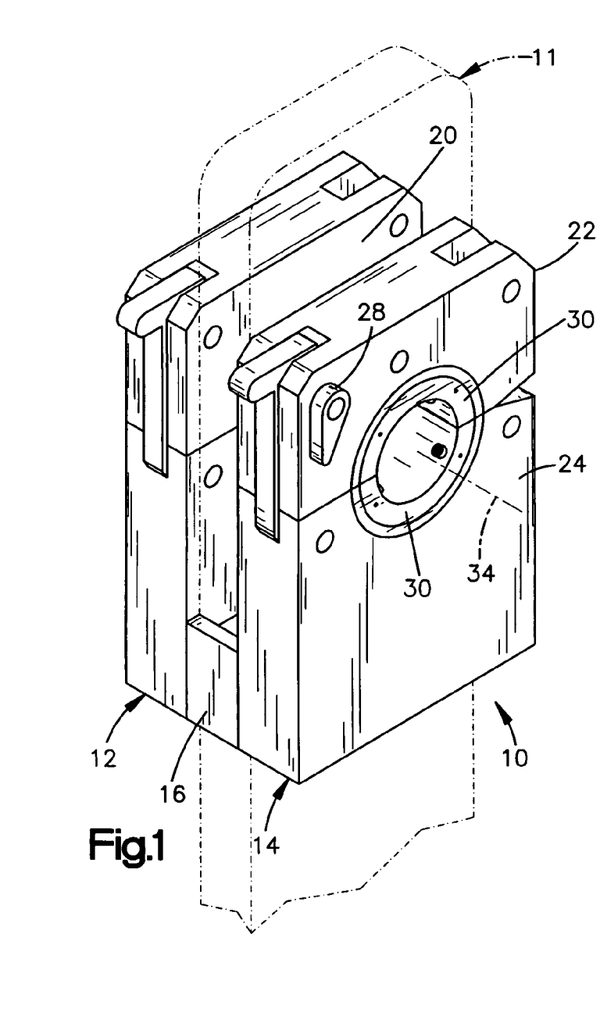
FIG. 1 is a pictorial view of a pipe clamping fixture including two collets that are a first embodiment of the invention.

FIG. 1 shows a pipe clamp fixture 10 which is intended to be used with an orbital welding head. The fixture 10 is designed to hold two pipe sections in aligned relationship with their facing ends abutting so that an electrode of an orbital welding head (for example as shown schematically at 11) can rotate about the mating pipe ends to perform a butt weld operation.

The pipe clamp fixture 10 includes a pair of clamping units 12 and 14 which are joined to opposite sides of an intermediate spacer 16. The various components are formed from stainless steel, aluminum, or the like and the clamp units 12 and 14 are removably joined to the spacer 16 in any convenient manner such as through the use of machine screws. The clamp units 12 and 14 are joined to the spacer 16 to form a somewhat U-shaped structure with an open welding space 20 adapted to receive the orbital welding head 11. The fixture 10 may if desired be secured to the welding head 11 by screws, for example.

In the illustrated embodiment, the clamping units 12 and 14 are of identical construction except that they are mirror images of one another. Therefore, only the clamp unit 14 is described herein.

Figure 2:
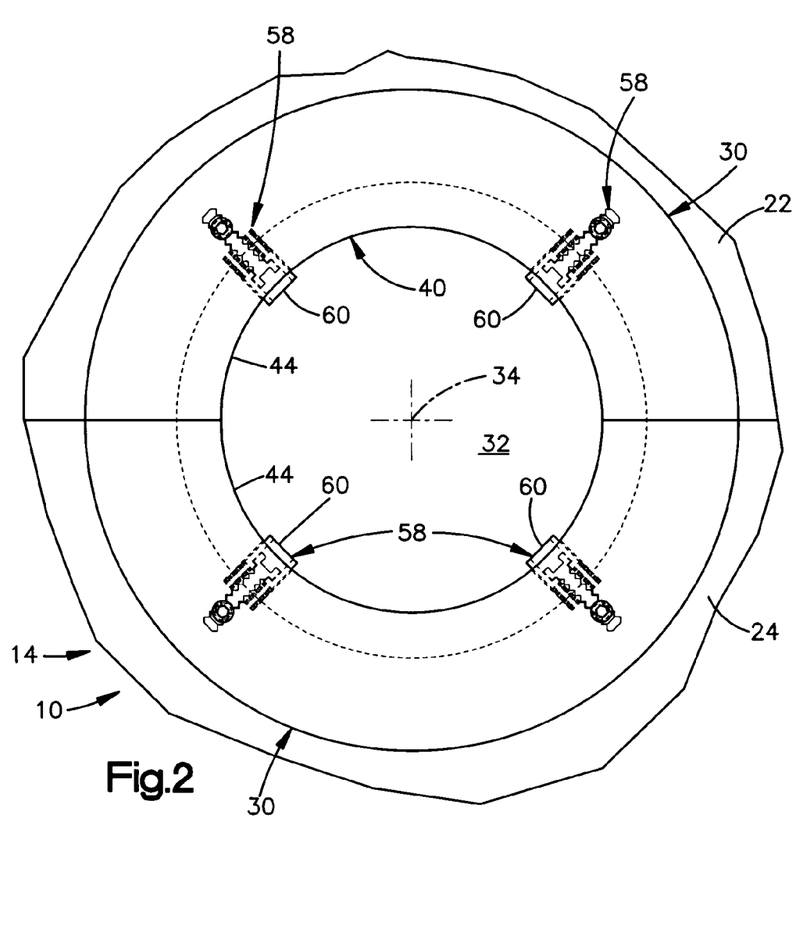
FIG. 2 is an elevational view of a portion of the fixture of FIG. 1 showing the two collets in a closed condition.
Figures 3, 4, 5, 6:
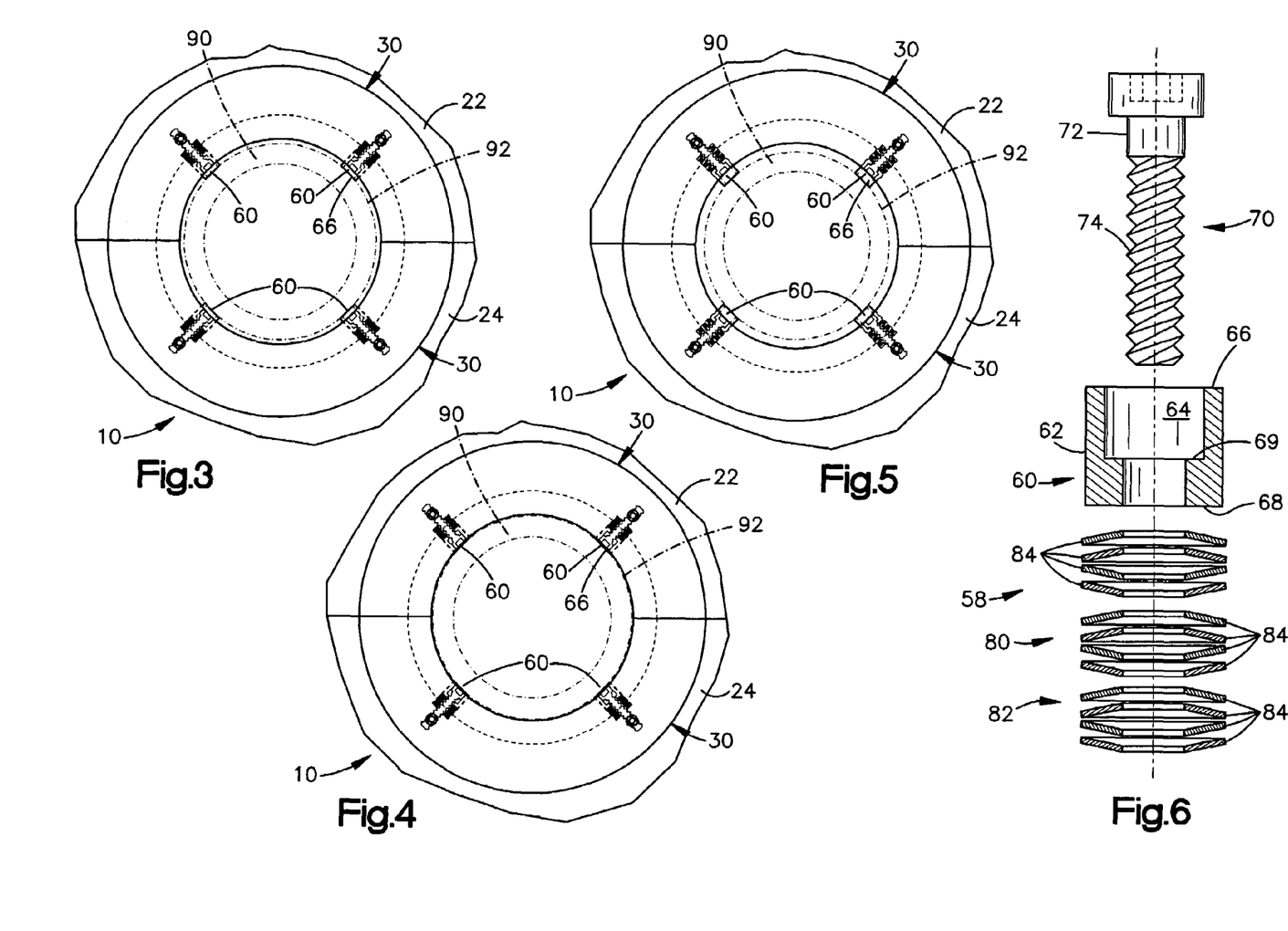
FIGS. 3-5 are views similar to FIG. 2 showing the two collets in a condition clamping pipes of different sizes.
FIG. 6 is an exploded sectional view of parts of one plunger.

As best shown in FIGS. 2 and 3, the clamp unit 14 comprises a pair of opposed clamp halves 22 and 24. The clamp halves 22 and 24 are connected with each other by a hinge or hinge mechanism which permits the clamp halves to be moved toward and away from one another between a closed position as shown in FIGS. 1 and 2 and an open position (not shown). The two clamp halves 22 and 24 are releasably connected in their engaged or clamping position by a releasable latch or lock fixture such as the one shown at 28.

Each one of the clamp halves 22 and 24 carries a collet 30. The collets 30 cooperate to define a circular work piece clamping opening 32 (FIG. 2) that is centered on an axis 34. The collets 30 of the two clamp halves 22 and 24 are identical to each other. The clamp halves 22 and 24 together form a collet holder that holds the two collets 30.

Each collet 30 includes a collet base 40. The collet base 40 as illustrated is a rigid metal member that is secured to the clamp half 22 by a pair of mounting screws (not shown). The collet base 40 has a circumferential extent of about 180 degrees about the axis 34. The collet base 40 has a cylindrical inner surface or base surface 44 centered on the axis 34.

The collet base 40 has one or more plunger openings 46. The plunger openings are spaces or cavities or chambers or recesses that receive and guide contact points 60 and springs 80, as described below. The contact points 60 are the portions of the collet 30 that actually contact the workpiece. The contact points 60 are formed separately from and are not integral with the collet base 40.

In the illustrated embodiment, the collet base 40 has two plunger openings in the form of recesses 46. The plunger openings 46 are formed in the base surface 44 of the collet base 40 and extend radially outward.

Each plunger opening 46 is defined by a cylindrical side surface 48 and a circular bottom end surface 50 both centered on a radially extending plunger axis 52. A threaded bore 54 extends from the plunger opening 46. Associated with each plunger opening 46 is a locking screw opening 56 that extends transverse to the bore 54 and that intersects the bore near its bottom end. In the illustrated embodiment, two plunger openings 46 are provided, spaced ninety degrees apart about the axis 34. A different number of plunger openings 46 could be provided, and different spacing could be provided between the openings. The plunger openings could alternatively be formed or configured in another manner—for example, they might not need to be recessed from the base surface 44.

Disposed within each one of the plunger openings 46 is a plunger assembly 58 (FIG. 6). The plunger assembly 58 includes a contact point or plunger 60; a mounting screw 70; and spring 80.

The plunger 60 is a movable member or contact point that) (together with the other plungers 60) forms that portion of the collet 30 which the workpiece contacts. The plunger 60 is movable relative to the collet base and to the axis 34, as described below. The plunger 60 is formed separately from and is not integral with the collet base 40.

The plunger 60 in the illustrated embodiment is an open-ended, hollow cylindrical member adapted to fit closely within the plunger opening 46. The plunger 60 is preferably made from 416 stainless steel, and has a hardness of 36 to 42 on the Rockwell C scale. Parts that are of this hardness have acceptable wear characteristics without being so hard that they would be brittle. The invention is not limited, however, to any particular material for the plungers.

The plunger 60 has a cylindrical side wall 62 that defines a central opening 64 centered on the axis. The side wall 64 has an annular top end surface 66 and an annular bottom end surface 68. The plunger 60 has a bottom flange 69 that extends radially inward from the side wall 62 to narrow the central opening 64 at the bottom (radially outer) end of the plunger.

The mounting screw 70 is an element or assembly that retains the plunger 60 in the plunger opening 46, that is, that keeps the plunger from moving radially inward past a certain position. In the illustrated embodiment, the retaining screw 70 is a socket head screw with a head 72 and a threaded shank 74. The head 72 of the retaining screw 70 is smaller in diameter than the central opening 64 of the plunger 60, but larger in diameter than the bottom flange 69 of the plunger.

The spring 80 is an element or assembly that biases the plunger 60 radially inward in a direction along the plunger axis 52. In the illustrated embodiment, the spring 60 is a stack 82 of Belleville washers 84. Other types of springs 80 could be used, for example, a compression spring. Thus, the term "spring" when used herein could refer to a single member that provides a biasing force or to a plurality of members or elements that act together to provide a biasing force. For example, a coil spring 80 could provide adequate compliance and loading, but not necessarily within the same small space as the Belleville washers 84. Polymer (as opposed to metal) springs 80 might also be used, but might not be able to withstand the temperatures commonly encountered when welding.

Each one of the Belleville washers 84 is dished or cupped. In the illustrated embodiment, the washers 84 are stacked in a particular manner so as to increase both load (resistance) and travel (total available deflection). A single Belleville spring 84 has a specific load and deflection. Belleville springs in stacked arrangements provide increased load and/or deflection. Specifically, two springs stacked in parallel (in the same direction or orientation) provide double the load or resistance of the single spring, with no increase in total deflection available. Two springs stacked in series (in the opposite direction or orientation) provide the same load or resistance as the single spring, with double the total deflection available. A parallel-series combination results in the load or resistance of two springs and the total available deflection of two springs.

In the illustrated embodiment, the washers 84 are stacked in a pattern that repeats three times. The pattern includes two washers 84 cupped down (in parallel with each other) and the next two washers cupped up (in parallel with each other but in series with the first pair). This arrangement provides a total of twelve washers 84.

The number and pattern of washers 84 illustrated herein is only exemplary. Different numbers of washers 84 could be provided, and they could be stacked in a different order or pattern. Different types of individual spring elements could be used, also, in the spring 80.

Figure 7:
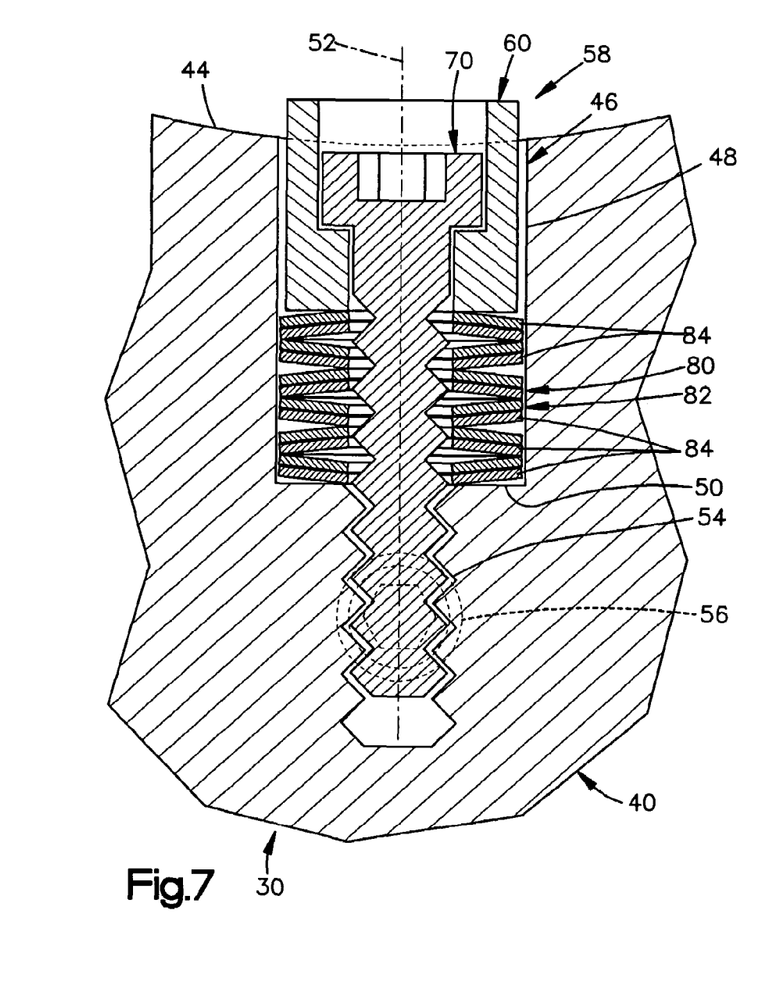
FIG. 7 is a sectional view of a portion of one collet with a plunger shown in a first position.

When the collet 30 is assembled, the stack 82 of washers 84 is disposed loosely in the plunger opening 46 in the collet base 40. The side wall surface 48 of the collet base 40 locates the washers 84 and keeps them centered in the plunger opening 46. The plunger 60 is located over the stack 82 of washers 84, resting on the uppermost washer. The shank 74 of the retaining screw 70 extends through the plunger 60 and through the stack 82 of washers 84 and is screwed into the threaded lower portion 54 of the plunger opening 46. The retaining screw 70 is preferably screwed in only until the head 72 of the retaining screw engages the bottom flange 69 of the plunger 60, taking the play or looseness out of the stack 82 of washers 84. Attempted further threading in of the retaining screw 70 would begin to compress the washers 84, which would resist such motion strongly and rapidly. The retaining screw 70 is left in this position where the spring 80 is not compressed by any significant amount.

A locking screw 88, which could be a socket set screw, is screwed into the locking screw opening 56 in the collet base 40 and engages the shank 74 of the retaining screw 70. The engagement of the locking screw 88 with the retaining screw shank 74 helps to hold the retaining screw 70 in the desired position relative to the collet base 40.

Figure 8:
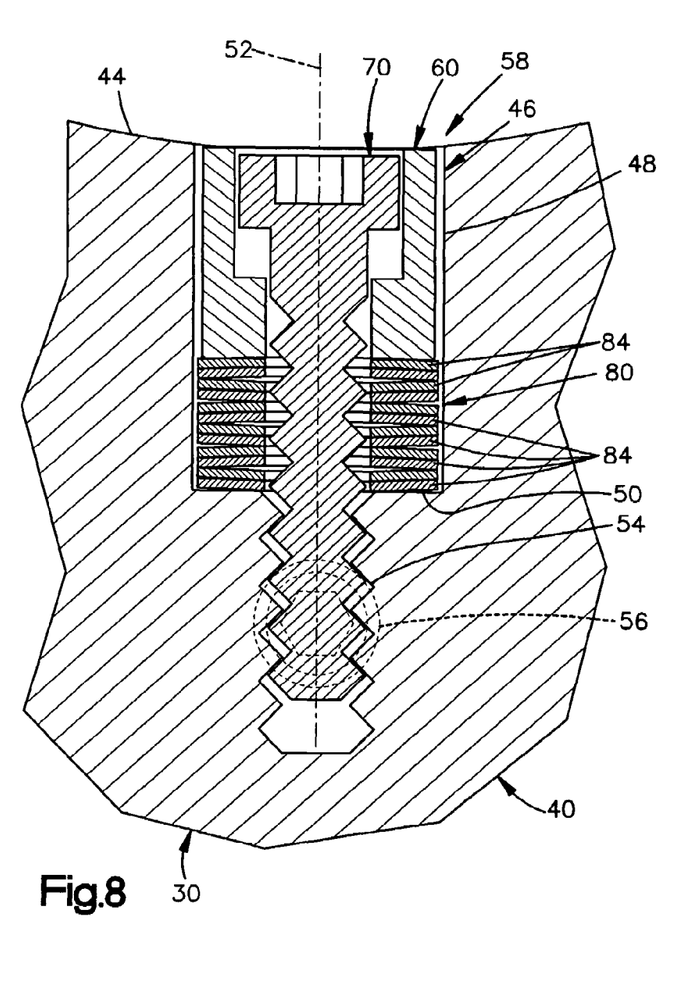
FIG. 8 is a view similar to FIG. 7 showing the plunger shown in a second position.
Figure 9:
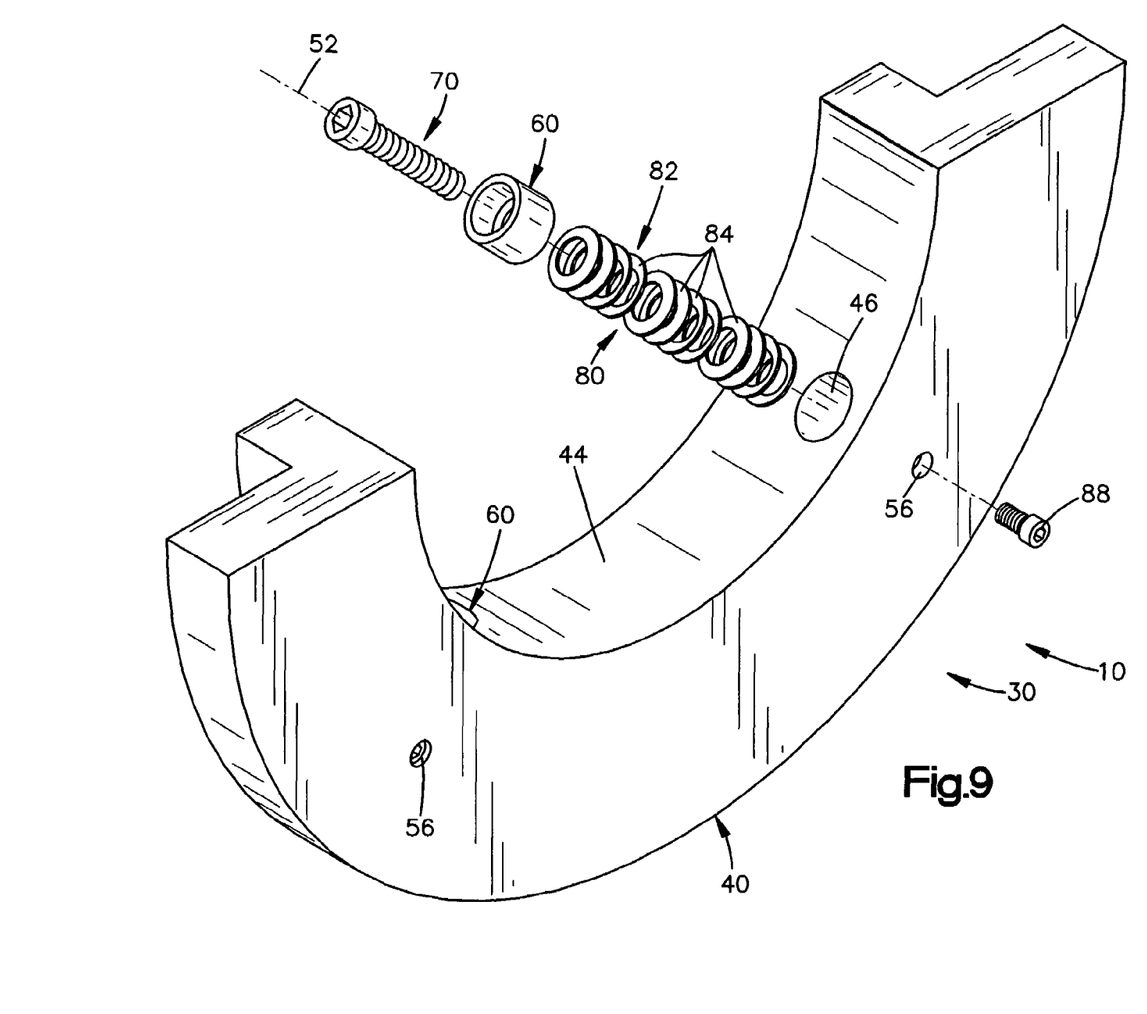
FIG. 9 is an exploded perspective view of one collet.

In the desired position, a portion but not all of the plunger 60 projects from the base surface 44 of the collet base 40. Up to one third to one half the length of the plunger 60 might project from the base surface 44. Preferably, no more than about twenty per cent of the plunger 60 projects from the base surface 44. The side wall surface 48 of the plunger opening 46 helps to guide the plunger 60 and keep it aligned, to minimize skewing. The head 72 of the retaining screw 70 is recessed below the base surface 44, as are all of the washers 84. The plungers 60 are the only portions of the collet 30 that contact the workpiece; the collet base 40, itself, does not.

When the fixture 10 is fully assembled, it includes four of the collet assemblies 30, two on each one of the clamping units 12 and 14. Each one of the clamping units 12 and 14 includes one collet 30 on its upper clamp half and one collet 30 on its lower clamp half.

FIG. 3 illustrates schematically the clamping unit 12 in use clamping a pipe 90. The four plungers that are included in the two collets 30 are in engagement with the pipe 90. Specifically, the top end surface 66 of each plunger 60 is in engagement with the outer side surface 92 of the pipe 90. Because the plungers 60 are located on opposite sides of the pipe 90, their combined resistance is averaged out to approximately center the pipe between them. This works for round pipe 90, as well as for out-of-round pipe, which often, from handling, has an oval outside profile. In this respect, the collet 30 (or a set of collets 30) can be considered to be self-aligning or self-centering.

FIG. 4 shows the fixture 10 in use in clamping a pipe 90 having a relatively larger diameter. FIG. 5 shows the fixture in use in clamping a pipe 90 having a relatively smaller diameter.

The clamping unit 14 is capable of rigidly and tightly engaging the outer diameter of a pipe of a particular size depending on the diameter of the collet base surface 44. By changing collet bases 40, the clamping unit 14 can be made to accommodate tubing or piping of different size ranges. Additionally, by providing different size collets in one clamping unit 14 relative to those in the other clamping unit 12, it is possible to bring into alignment two workpieces of different sizes such that it is possible to weld various pipe and fitting combinations.

The upper collet 30 and the lower collet 30 of a clamping unit 12 or 14 are the same and are interchangeable. Some other collet designs are sold as matched sets—if one collet becomes damaged to the point where it can no longer be used, the other collet half must be scrapped, because the new collets must be ordered as a set.

Another advantage of the collet 30 is cost-effectiveness. A collet in accordance with the present invention can be relatively inexpensive to make, because the majority of machined surfaces are clearance surfaces. Also, wear components of the collet 30, such as the plungers 60 and the washers 84, can be replaced very easily, while retaining the collet base 40 itself. This can provide the collet 30 with a very long service life. For example, if the spring 80 begins at some point to lose its temper, it can be easily and inexpensively replaced—in comparison to a collet with integral spring fingers in which case the entire collet must be replaced.

Figures 10, 11, 12, 13:
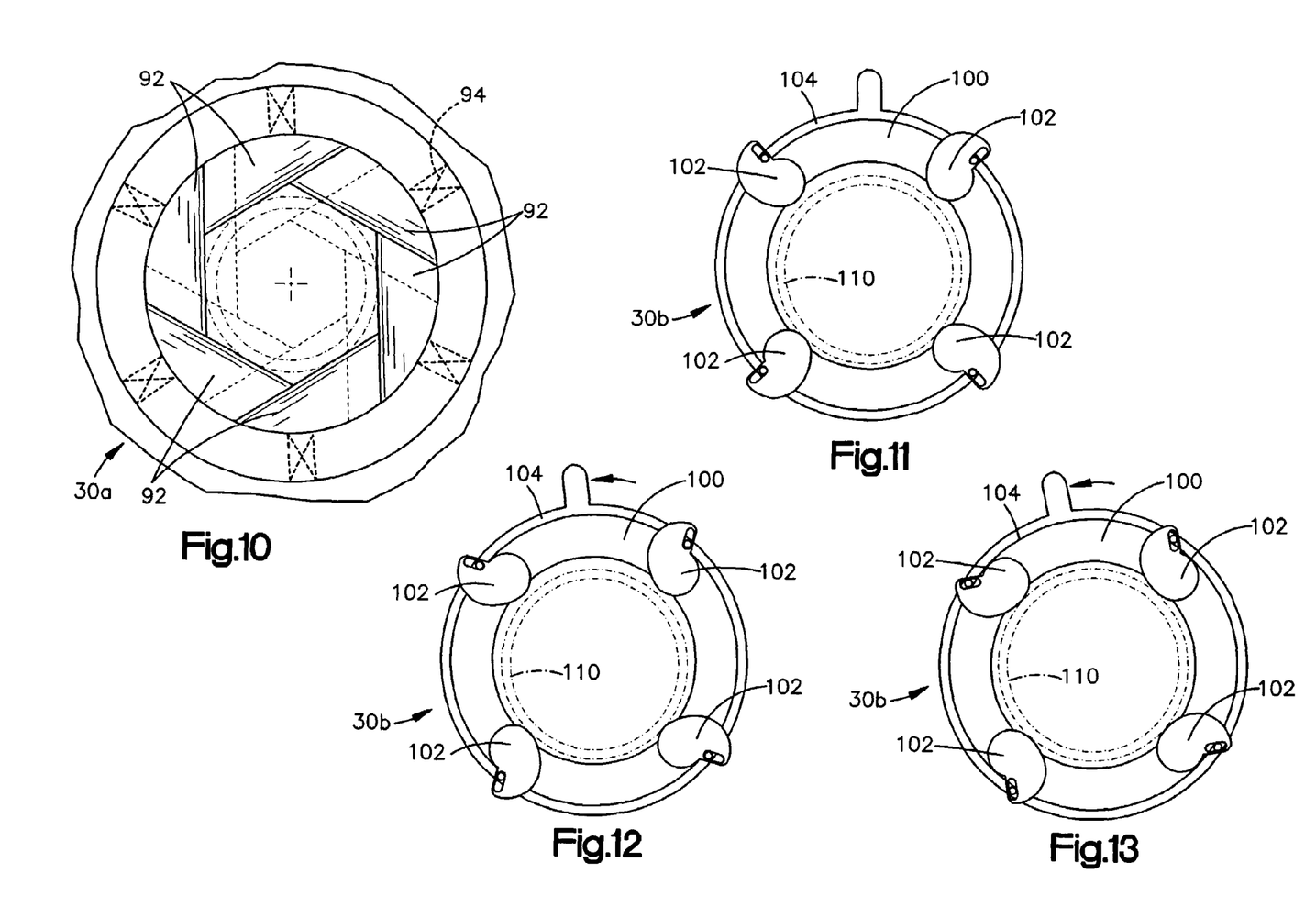
FIG. 10 is a schematic view of a collet that is another embodiment of the invention.
FIGS. 11-13 are a series of views of a collet that is another embodiment of the invention.

FIG. 10 illustrates schematically a collet 30a that is an alternative embodiment of the invention. The collet 30a functions similarly to a camera aperture. The collet includes a plurality of contact points in the form of plates 92 that slide about a center point. The plates 92 are biased radially inward by springs shown schematically at 94. The plates 92 open and close equally so as automatically to center a pipe that is captured between them. In this respect, the collet 30a can be considered to be self-aligning or self-centering.

FIGS. 11-13 illustrate schematically a collet 30b that is another alternative embodiment of the invention. The collet 30b includes a base ring 100 on which are rotatably mounted four contact points in the form of eccentric cams 102. Rotation of the cams 102 is controlled by a slider ring 104 that engages the cams. Relative rotation of the slider ring 104 about the base ring 100 causes the cams 102 to pivot.

FIG. 11 shows the eccentric cams 102 fully open. A pipe section 110 is disposed within the collet 30b in a position not centered in the collet. FIG. 12 shows the cams 102 rotating as the slider ring 104 is rotated relative to the base ring 100, in a counter-clockwise direction as viewed in FIG. 12. The cams 102 move radially inward, two of the cams contact the pipe 110, and the pipe begins to move towards the center of the collet 30b. FIG. 13 shows all four cams 102 in contact with the pipe section 110. The pipe section 110 is centered within the collet 30b. In this respect, the collet 30b can be considered to be self-aligning or self-centering.

Figure 14:
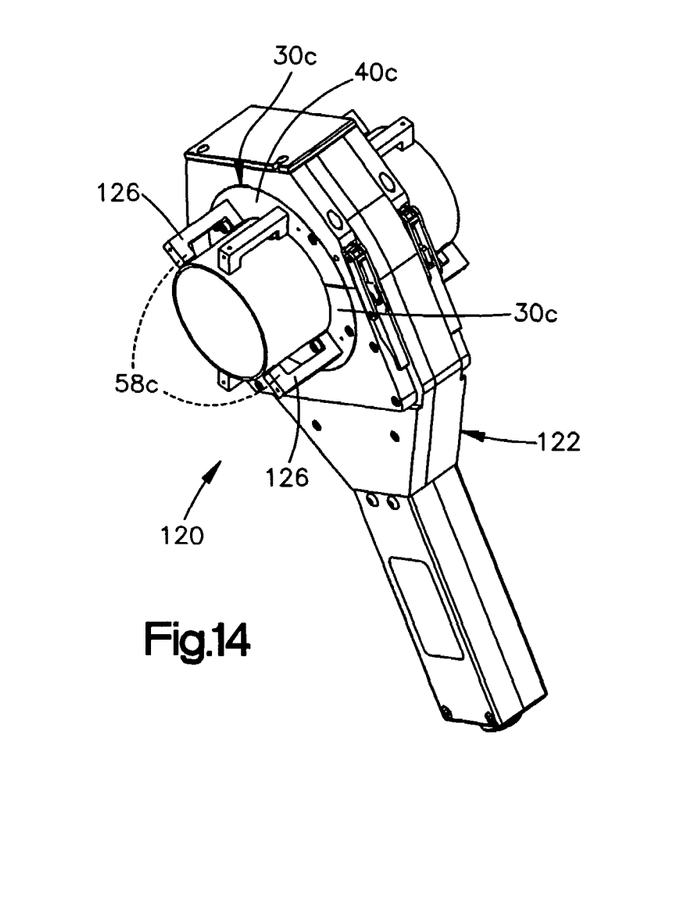
FIGS. 14-15 illustrate another clamping fixture in accordance with the invention.
Figure 15:
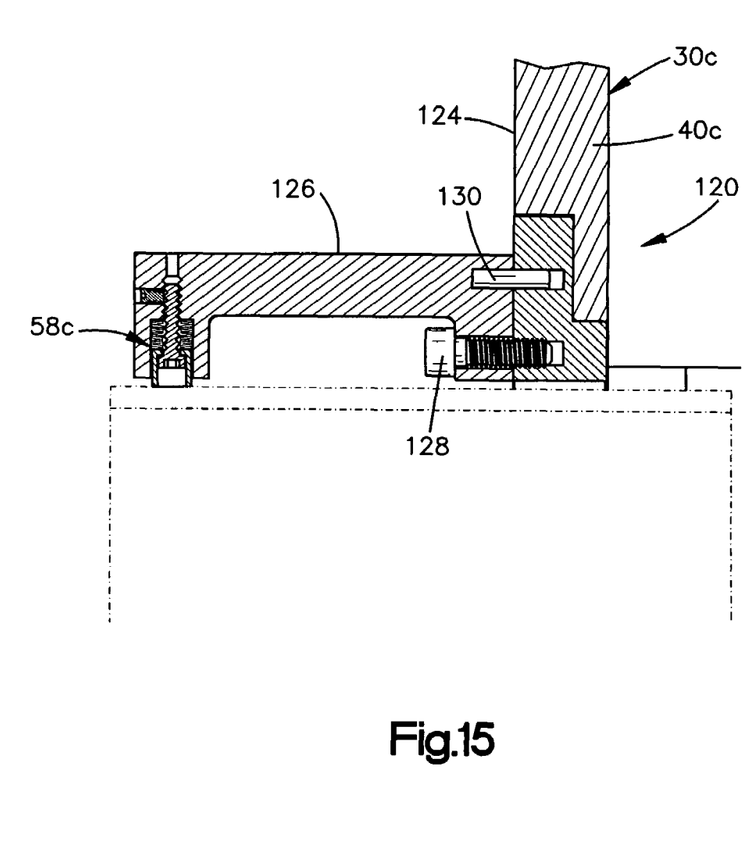

FIGS. 14 and 15 illustrate still another embodiment of the invention. In this embodiment, a collet includes contact points in the form of plunger assemblies at two axially spaced locations (that is, spaced apart in a direction along the axis of the workpiece being clamped) to help improve clamping accuracy and squareness.

FIG. 14 shows a clamping fixture 120 with an attached or inserted weld head 122. The clamping fixture 122 includes four collets (numbered 30c in FIG. 14) like the collet 10. Each one of the collets is modified by the addition of two additional plunger assemblies.

In the collet 30c, the collet base 40c has an outer side surface 124 to which are attached two cantilever arms 126. The cantilever arms 126 are attached to the collet base 40c by mounting screws 128 and pins 130, or other mounting structure. The arms 126 may be attached to the collet base 40c at locations that are spaced apart circumferentially from the locations of the plunger assemblies 58. The arms 126 extend axially away from the collet base 40c (that is, in a direction along the axis of the workpiece being clamped).

At the outer end of each arm 126 is a contact point in the form or a plunger assembly 58c that is preferably similar to or identical to the plunger assemblies 58. The plunger assembly 58c is by virtue of its location on the cantilever arm 126 spaced apart axially from the collet base 40c. As a result, the plunger assembly 58c is spaced apart axially from the other plunger assemblies 58 that are in the collet base 40c. The pipe section is thereby clamped at two locations along its length. This can help to increase the clamping accuracy (squareness) of the fixture 120 by an order of magnitude or more. This can be useful when welding on a vertical run of pipe, for example.

Collets formed in accordance with the subject invention can be used in a variety of structures and clamping assemblies. For example, the collet could be used in a fixture for holding a pipe to be end faced (squared). Also, the collet could be used in a welding fixture for welding a fitting to a pipe, with the two clamp units being of different sizes. Accordingly, applicant intends to include all such modifications and alterations as part of the invention insofar as they come within the scope of the appended claims.

Having described the invention, I claim:

1. A collet for holding a workpiece having an axis, said collet comprising:

a collet base defining a collet axis; and a plurality of contact surfaces, each of said plurality of contact surfaces being supported on said collet base for movement relative to said collet base in directions generally toward and away from the collet axis to hold the workpiece; biasing means for applying a biasing force between said contact surfaces and the workpiece when in use; said biasing means comprising one or more springs associated with said contact surfaces to bias said contact surfaces in a direction toward the collet axis;

said contact surfaces being adapted to hold the workpiece coaxially with said collet base, with said contact surfaces being the only contact between the collet and the workpiece.

2. A collet as set forth in claim 1 wherein said springs are not integral with said collet base or with said contact surfaces.

3. A collet as set forth in claim 2 wherein said each one of said plurality of springs comprises a plurality of spring elements.

4. A collet as set forth in claim 3 wherein each one of said spring elements is a Belleville washer.

5. A collet as set forth in claim 4 wherein at least some of said Belleville washers in each one of said springs are stacked in opposite directions.

6. A collet as set forth in claim 5 wherein said Belleville washers in each one of said springs are stacked in a repeating pattern of two washers cupped down and two washers cupped up.

7. A collet as set forth in claim 6 wherein said collet base has a plurality of openings and each said contact surface is part of a plunger that is at least partially received in said openings.

8. A collet as set forth in claim 7 wherein each one of said plurality of openings is defined at least partially by a respective guide surface, each one of said plungers being guided for movement and alignment by its associated guide surface.

9. A collet as set forth in claim 8 wherein said openings are recesses in said collet base.

10. A collet as set forth in claim 1 wherein said biasing means comprises a respective spring associated with each one of said contact surfaces.

11. A collet as set forth in claim 10 wherein each one of said springs comprises a plurality of spring elements.

12. A collet as set forth in claim 11 wherein each one of said spring elements is a Belleville washer.

13. A collet as set forth in claim 1 wherein each one of said contact surfaces is an open ended, hollow cylindrical member at least partially received in an opening in said collet base.

14. A collet as set forth in claim 13 including a mounting member associated with each contact surface that has a portion engageable with said member to block movement of said member out of said opening.

15. A collet as set forth in claim 14 wherein said mounting member has a shank portion that extends through one end of said contact point and has a head portion that is disposed within said contact point and that is engageable with a surface of said contact point to block movement of said contact point out of said opening.

16. A collet as set forth in claim 15 further comprising a spring associated with each contact surface and biasing said contact surface in a direction generally toward said collet axis, said spring having an open center through which said shank portion of said mounting member extends.

17. A collet as set forth in claim 16 wherein said spring comprises a plurality of spring elements.

18. A collet as set forth in claim 1 comprising a plurality of plungers with each said contact surface being formed on a respective plunger, wherein said collet base has a cylindrical base surface centered on an axis and first and second recesses extending radially outward from said base surface, said collet including mounting screws having heads that engage said plungers, said mounting screws having shanks, said collet further comprising springs in said recesses through which said mounting screw shanks extend.

19. A collet as set forth in claim 18 wherein said each one of said springs comprises a plurality of Belleville washers.

20. A collet as set forth in claim 1 wherein further comprising a plurality of contact surfaces that are located on cantilever arms extending from said collet base.

21. The collet as set forth in claim 1 in combination with a weld head wherein said weld head comprises an orbital weld head.

* * * * *